United States Patent [19]

Sato et al.

[11] Patent Number: 4,579,393

[45] Date of Patent: Apr. 1, 1986

[54] ANTILOCK BRAKING DEVICE

[75] Inventors: Makoto Sato, Kamifukuoka; Etsuo Fujii, Wako; Mitsutoyo Mizusawa; Masao Fujisawa, both of Ueda; Mitsuo Toyoda, Tokyo, all of Japan

[73] Assignees: Nissan Kogyo Kabushiki Kaisha; Honda Giken Kogyo Kabushiki Kaisha, both of Japan

[21] Appl. No.: 545,326

[22] Filed: Oct. 25, 1983

[30] Foreign Application Priority Data

Oct. 29, 1982 [JP] Japan ............................ 57-164870[U]
Oct. 29, 1982 [JP] Japan ............................ 57-164872[U]
Nov. 19, 1982 [JP] Japan ............................ 57-175170[U]
Nov. 19, 1982 [JP] Japan ............................ 57-175171[U]

[51] Int. Cl.$^4$ ............................ B60T 13/00; B60T 8/40
[52] U.S. Cl. ................................ 303/6 C; 303/116
[58] Field of Search .................. 303/91, 93, 94, 95, 303/102, 103, 105, 111, 116, 119, 22 R, 6 C, 113, 115, 117, 118; 188/181 C

[56] References Cited

U.S. PATENT DOCUMENTS 4,438,629 3/1984 Sato et al. ........................ 303/6 C

FOREIGN PATENT DOCUMENTS 2610585 9/1977 Fed. Rep. of Germany .

Primary Examiner—Bruce H. Stoner, Jr.
Assistant Examiner—Alvin Oberley
Attorney, Agent, or Firm—Armstrong, Nikaido, Marmelstein & Kubovcik

[57] ABSTRACT

Disclosed is an antilock braking device including a first braking hydraulic adjusting member actuated so as to restrain braking oil pressure of wheel cylinders individually corresponding to left and right front wheels in response to antilock braking oil pressure for front wheels; a second braking hydraulic adjusting member actuated so as to restrain braking oil pressure of wheel cylinders individually corresponding to left and right rear wheels in response to antilock braking oil pressure for rear wheels; an antilock control system having a reservoir and a pump for pressurizing control oil from said reservoir to generate said antilock control oil pressure; and a tandem type master cylinder having a pair of output ports independent of each other connected to said both braking hydraulic adjusting members to generate braking oil pressure of each of said wheel cylinders, characterized in that a proportional reducing valve is interposed between both braking hydraulic adjusting members in order to supply braking oil pressure from the first or second braking hydraulic adjusting member corresponding to the front wheel or rear wheel subject to the larger supporting load to the second or first braking hydraulic adjusting member corresponding to the rear wheel or front wheel subject to the smaller supporting load.

9 Claims, 5 Drawing Figures

ANTILOCK BRAKING DEVICE

BACKGROUND OF THE INVENTION

1. Field of the Invention

The present invention relates to antilock braking devices, and particularly to an antilock braking device including a first braking hydraulic adjusting means actuated so as to restrain braking oil pressures of wheel cylinders as corresponding to left and right front wheels, respectively, in response to antilock control oil pressure for front wheels; a second braking hydraulic adjusting means actuated so as to restrain braking oil Pressures of wheel cylinders as corresponding to left and right rear wheels, respectively, in response to antilock control oil pressure for rear wheels; an antilock control system having a reservoir and a pump for pressurizing control oil from said reservoir to generate said antilock control oil pressure; and a tandem type master cylinder having a pair of output ports independent of each other connected to said both braking hydraulic adjusting means to generate braking oil pressure of each of said wheel cylinders.

2. Description of the Prior Art

In the past, in such antilock braking device, the number of times of participation of the antilock control system in both the braking hydraulic adjusting means has not been taken into consideration. Thus, there are many times of actuation of the antilock control system, resulting in shortening of a service life of the antilock control system.

SUMMARY OF THE INVENTION

The present invention has been accomplished in view of the above-described circumstances. It is a first object of the present invention to provide an antilock braking device in which frequency of actuation of an antilock control system corresponding to a wheel where the supporting load is smaller is reduced to prolong the service life of said control system and increase the braking stability.

To achieve the above-described object, according to a first invention, a proportional reducing valve is interposed between both first and second braking hydraulic adjusting means in order to supply braking oil pressure from the first or second braking hydraulic adjusting means corresponding to a front wheel or a rear wheel of larger supporting load to the second or first braking hydraulic adjusting means corresponding to a rear wheel or front wheel of smaller supporting load.

With this arrangement, braking oil pressure from a master cylinder is proportionally reduced and applied to the wheel cylinder corresponding to the front wheel or rear wheel of the smaller supporting load. Accordingly, frequency of actuation of the antilock control system corresponding to the front wheel or rear wheel of smaller supporting load is reduced to prolong the service life of the control system, and in addition, there is present no factor which restrains a flow of braking oil between the wheel cylinder and the braking hydraulic adjusting means, the braking oil is well returned to the braking hydraulic adjusting means from the wheel cylinder corresponding to the front wheel or rear wheel of smaller supporting load, thus increasing the braking stability.

It is noted in the first invention that preferably, both the braking hydraulic adjusting means and the proportional reducing valve are integrally assembled so that the antilock braking device becomes compact, but desirably, removal of air from the proportional reducing valve can be carried out easily and positively.

It is therefore a further object incidental to the first object to provide an antilock braking device in which braking oil of the proportional reducing valve is made to flow vertically to render removal of air easy and positive.

Desirably, in the first invention, even if an inconvenience occurs in a braking hydraulic system controlled by the braking hydraulic adjusting means, a braking force at the minimum needed is obtained.

It is therefore another object incidental to the first object to provide an antilock braking device in which the braking hydraulic adjusting means corresponding to the wheel of small supporting load is disposed at a position higher than that of the braking hydraulic adjusting means corresponding to the wheel of larger supporting load to thereby positively actuate the braking hydraulic adjusting means corresponding to the wheel of larger supporting load.

In the antilock control system, in the event that air is mixed into an oil passage for supplying control oil from a reservoir to a pump and fed into the pump, negative pressure is generated and exerted by that amount to decrease a pressing force, resulting in an inconvenience in delicate adjustment of oil pressure in the braking hydraulic adjusting means.

It is therefore a second object of the present invention to provide an antilock braking device in which even if air is mixed into an oil passage for supplying control oil from a reservoir to a pump, the air is rapidly discharged outside through the reservoir without staying in the oil passage.

According to a second invention which achieves the above-described second object, the reserovir is disposed at a position higher than that of a suction joint of the pump.

In this manner, air in the oil passage extending from the reservoir to the pump is guided into the reservoir to naturally remove air, and control oil pressurized to a fixed level by the pump can be fed into the braking hydraulic adjusting means to effect adjustment of braking pressure with accuracy.

DESCRIPTION OF THE PREFERRED EMBODIMENTS

Figure 1:
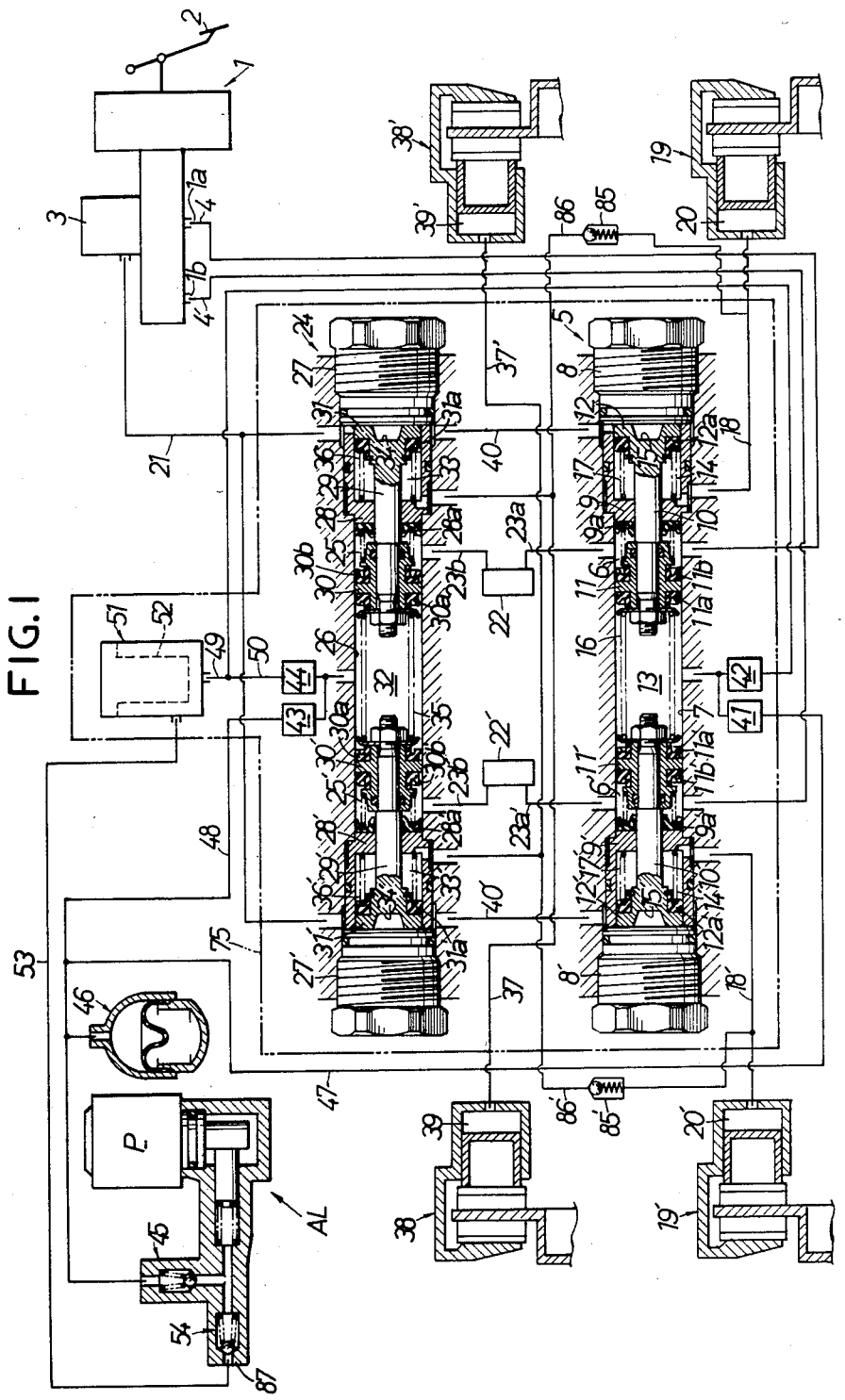
FIG. 1 is a systematic view in which the present invention is applied to a four-wheeled automotive vehicle of front engine, front wheel driving type wherein the supporting load on the front wheel side is larger than that on the rear wheel side.

In the following there will be described an embodiment of this invention when applied to a four-wheeled automotive vehicle of front engine, front wheel driving type wherein the supporting load on the front wheel side is larger than that on the rear wheel side. Referring first to FIG. 1, when a brake pedal 2 is trod on, a tandem type master cylinder 1 serves to feed braking oil supplied from an oil tank 3 to primary braking hydraulic chambers 6, 6' of a first braking hydraulic adjusting means 5 through a pair of output ports 1a, 1b and a pair of oil passages 4, 4' which constitute braking hydraulic systems independent of each other, respectively.

Figure 2:
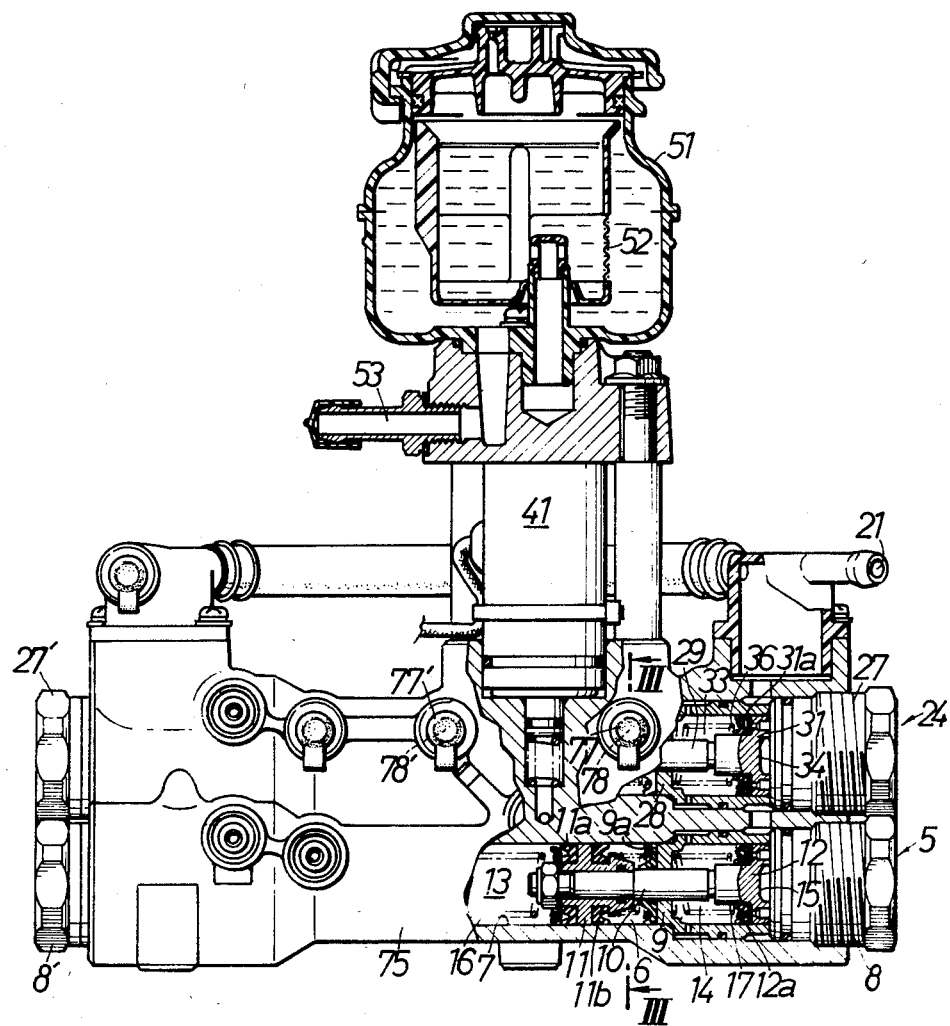
FIG. 2 is a front view in section showing an assembly in partly sectioned.

Referring also to FIG. 2, the braking hydraulic adjusting means 5 comprises a cylinder 7 having both ends closed by a pair of end wall members 8, 8'; a pair of partition walls 9, 9' disposed within the cylinder 7 in positions spaced from the respective end wall members 8, 8'; and a pair of rods 10, 10' which include pairs of pistons 11, 12 and 11', 12' respectively at both ends thereof and which have those portions between both pistons that slidably penetrate through the partition walls 9, 9' in the axial direction. A cylinder chamber between the partition wall 9 and the piston 11 constitutes a primary braking hydraulic chamber 6 in a first hydraulic system which chamber is communicated with the master cylinder 1 through the oil passage 4, a cylinder chamber between the partition wall 9 and the piston 12 constitutes a secondary braking hydraulic chamber 14 in the first hydraulic system which chamber is communicated with a wheel cylinder hydraulic chamber 20 of a wheel cylinder 19 for left front wheel through an oil passage 18, and on the other hand, a cylinder chamber between the parition wall 9' and the piston 11' constitutes a primary braking hydraulic chamber 6' in a second hydraulic system which chamber is communicated with the master cylinder 1 through the oil passage 4', and a cylinder chamber between the partition wall 9' and the piston 12' constitutes a secondary braking hydraulic chamber 14' in the second hydraulic system which chamber is communicated with a wheel cylinder hydraulic chamber 20 of a wheel cylinder 19' for right front wheel through an oil passage 18'. A cylinder chamber between the pair of pistons 11 and 11' constitutes an antilock controlling hydraulic chamber 13 to or from which antilock controlling oil is supplied or exhausted depending on the associated operation of an intake pressure control valve 41 and an exhaust pressure control valve 42.

In the controlling hydraulic chamber 13, a compressed spring 16 is interposed between the pair of pistons 11 and 11'. In the secondary braking hydraulic chamber 14, a compressed spring 17 is interposed between the partition wall 9 and the piston 12, and in the secondary braking hydraulic chamber 14', a compressed spring 17' is interposed between the partition wall 9' and the piston 12'. The resilient restoring action of these compressed springs 16 and 17, 17' allows the respective pistons 11, 12 and 11', 12' to be held in fixed withdrawn positions at all times while the brakes are not applied.

In order to prevent a leak of pressurized oil between the adjacent cylinder chambers, the so-called cup type seal members 11a, 11b and 11a' 11b' in the annular form, which have an effect of preventing a reverse flow of the pressurized oil, are respectively mounted on both sides of the pistons 11, 11', cup type seal members 9a, 9a' are respectively mounted on the partition walls 9, 9' on the side of the primary braking hydraulic chambers 6, 6', and cup type seal members 12a, 12a' are respectively mounted on the pistons 12, 12' on the side of the secondary braking hydraulic chambers 14, 14'. Among them, the pair of seal members 9a, 9a' serve to prevent a leak of the pressurized oil within the primary braking hydraulic chambers 6, 6' into the secondary braking hydraulic chambers 14, 14' thereby to avoid that the pistons 12, 12' lose a function to move in the direction approaching to each other, while the pair of seal members 12a, 12a' serve to prevent a leak of the pressurized oil within the secondary braking hydraulic chambers 14, 14' into the side of the oil passage 21 thereby to ensure that the sufficient secondary braking oil pressure will be generated.

The primary braking hydraulic chambers 6, 6' of the first braking hydraulic adjusting means 5 are respectively communicated with corresponding primary hydraulic chambers 25, 25' of a second braking hydraulic adjusting means 24 through oil passages 23a, 23a', proportional reducing valves 22, 22' and oil passages 23b, 23b'. The second braking hydraulic adjusting means 24 has basically the same construction as the aforementioned first braking hydraulic adjusting means 5.

That is, the second braking hydraulic adjusting means 24 comprises a cylinder 26 having both ends closed by a pair of end wall members 27, 27'; a pair of partition walls 28, 28' disposed within the cylinder 26 in positions spaced from the respective end wall members 27, 27'; and a pair of rods 29, 29' which include pairs of pistons 30, 31 and 30', 31' respectively at both ends thereof and which have those portion between both pistons that slidably penetrate through the partition walls 28, 28' in the axial direction. A cylinder chamber between the partition wall 28 and the piston 30 constitutes a primary braking hydraulic chamber 25 in the first hydraulic system which chamber is communicated with the primary braking hydraulic chamber 6 of the first braking hydraulic adjusting means 5 as previously mentioned. A cylinder chamber between the partition wall 28 and the piston 31 constitutes a secondary braking hydraulic chamber 33 in the first hydraulic system which chamber is communicated with a wheel cylinder hydraulic chamber 39 of a wheel cylinder 38 for right rear wheel through an oil passage 37. On the other hand, a cylinder chamber between the partition wall 28' and the piston 30' constitutes a primary braking hydraulic chamber 25' in the second hydraulic system which chamber is connected to the primary braking hydraulic chamber 6' of the first braking hydraulic adjusting means 5 as previously mentioned. A cylinder chamber between the partition wall 28' and the piston 31' constitutes a secondary braking hydraulic chamber 33' in the second hydraulic system which chamber is communicated with a wheel cylinder hydraulic chamber 39' of a wheel cylinder 38' for left rear wheel through an oil passage 37'. A cylinder chamber between the pair of pistons 30 and 30' constitutes an antilock controlling hydraulic chamber 32 to or from which antilock controlling oil is supplied depending on the operation of an intake pressure control valve 42 and an exhaust presssure control valve 43.

In the controlling hydraulic chamber 32, a compressed spring 35 is interposed between the pair of pistons 30 and 30'. In the secondary braking hydraulic chamber 33, a compressed spring 36 is interposed between the partition wall 28 and the piston 31, and in the secondary braking hydraulic chamber 33', a compressed spring 36' is interposed between the partition wall 28' and the piston 31'. The resilient restoring action of these compressed springs 35 and 36, 36' allows the respective pistons 30, 31 and 30', 1' to be held in fixed withdrawn positions at all times while the brakes are not applied.

Cup type seal members 30a, 30b and 30a', 30b' are respectively mounted on the both sides of the pistons 30, 30', cup type seal members 28a, 28a' are respectively mounted on the partition walls 28, 28'; on the side of the primary braking hydraulic chambers 25, 25', and cup type seal members 31a, 31a' are respectively mounted on the pistons 31, 31' on the side of the secondary braking hydraulic chambers 33, 33'.

A cylinder chamber between the end wall member 27 and the piston 31 in the second braking hydraulic adjusting means 24 constitutes a releasing oil chamber 24 which chamber is communicated with the oil tank 3 through the oil passage 21 and communicated with a releasing oil chamber 15 between the end wall member 8 of the first braking hydraulic adjusting means 5 and the piston 12 through the oil passage 40. A cylinder chamber between the end wall member 27' in the second braking hydraulic adjusting means 24 and the piston 31' constitutes a releasing oil chamber 34' which chamber is communicated with the oil tank 3 through the oil passage 21 and communicated with a releasing oil chamber 15' between the end wall member 8' of the first braking hydraulic adjusting means 5 and the piston 12'.

The pair of proportional reducing valves 22, 22' serve to regulate the primary braking oil pressure, particularly immediately after the starting of braking operation, such that a braking force exerted on the rear wheels subject to smaller supporting load becomes smaller than that exerted on the front wheels subject to larger supporting load in accordance with distribution of the supporting load.

Figure 3:
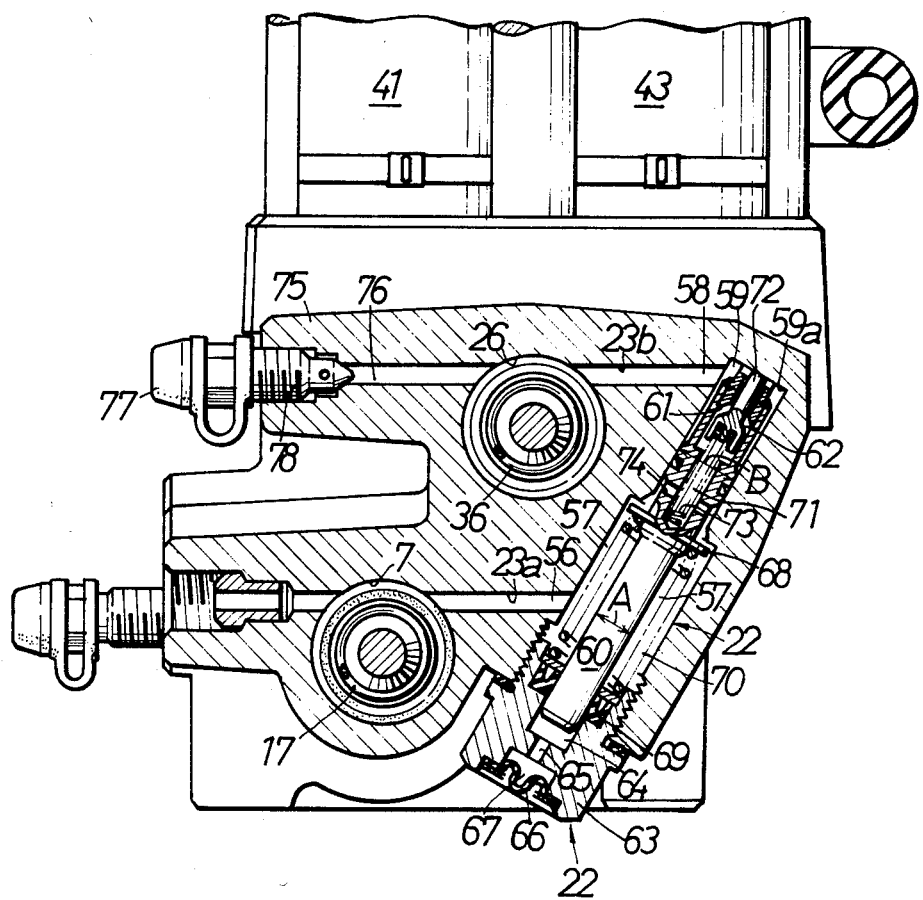
FIG. 3 is a sectional view of essential parts taken on line III—III of FIG. 2.

Referring also to FIG. 3, one proportional reducing 22 comprises an input hydraulic chamber 57 communicated with an inlet 56 in communication with an oil passage 23a, an output hydraulic chamber 59 communicated with an outlet 58 in communication with an oil passage 23b, a piston 60 displaced within both hydraulic chambers 57, 59, a valve seat 61 fixedly provided on one end adjacent the output hydraulic chamber 59 of the piston 60, and a valve body 62 provided opposite the valve seat 61. The other end of the piston 60 is axiallY displaceably and oil tightly fitted in a guide recess 64 formed in a cap 63 for closing the input hydraulic chamber 57. This cap 63 is formed with a gas flowing hole 65 to allow displacement of the piston 60, the gas flowing hole 65 being communicated with a vacant chamber 67 cut off from atmosphere by a bellows 66. Thus, gas between the piston 60 and the bottom of the guide recess 64 can freely flow into the vacant chamber 67 through the gas flowing hole 65, and the bellows 66 flexes so as to allow such gas to flow so that the piston 60 may be freely displaced. A flange 68 radially and outwardly extended is provided halfway of the piston 60, and a spring 70 is interposed between the flange 68 and a seal member 69 which is in sliding contact with the other end of the piston 60 to provide a seal between the input hydraulic chamber 57 and the guide recess 64. The piston 60 is biased towards the output hydraulic chamber 59 by the force of the spring 70.

An oil passage 71 extending in a direction of axis is formed adjacent one end from the flange 68 of the piston 60, and the valve seat 61 is fixed concentrically in communication with the oil passage 71. The oil passage 71 is communicated with the input hydraulic chamber 57 through a through-hole 74 extending in a radial direction of the piston 60. The valve body 62 is disposed opposite the valve seat 61 and within the oil passage 71, and a supporting rod 72 is concentrically secured to the valve body 62, the supporting rod 72 extending through the valve seat 61 and capable of coming into contact with an end wall 59a of the output hydraulic chamber 59. This supporting rod 72 has such a function that it is displaced towards the end wall 59a together with the piston 60 to come into contact with the end wall 59a thereby to move the valve body 62 from the valve seat 61, that is, opening the valve. Further, a spring 73 is interposed between the end wall close to the flange 68 of the oil passage 71 and the valve body 62, and the valve body 62 is biased towards the valve seat 61 by the force of the spring 73.

In the proportional reducing valve 22 as described above, when oil pressure of the input and output hydraulic chambers 57, 59 reaches a fixed value, a pressing force directed leftwards and downwards in FIG. 3 (which corresponds to a value obtained by multiplying a sectional area A of a portion of the piston 60 fitted into the guide recess 64 by oil pressure of the input and output hydraulic chambers 57, 59) overcomes a biasing force of the piston 70 applied to the piston 60, by oil pressure exerting on the piston 60, to move the piston 60 downwards in FIG. 3. Thereby, the valve body 62 becomes seated on the valve seat 61 and the input hydraulic chamber 57 and output hydraulic chamber 59 are cut off. Thereafter, if oil pressure of the input hydraulic chamber 57 increases, a pressing force directed upwardly (which substantially corresponds to a value obtained by multiplying a difference between a sectional area B of a sliding portion with the output hydraulic chamber 59 of the piston 60 and said sectional area A by oil pressure of the input hydraulic chamber 57. Here, B>A.) of the piston 60 resulting from oil pressure of the input hydraulic chamber 57 overcomes a a pressing force directed downwards (which substantially corresponds to a value obtained by multiplying said sectional area B by oil pressure of the output hydraulic chamber 59) of the piston 60 resulting from oil pressure of the output hydraulic chamber 59 to push back the piston 60 upwardly in FIG. 3 to move the valve body 62 away from the valve seat 61. Thus, both the hydraulic chambers 57 and 59 are again communicated with each other and oil pressure in the output hydraulic chamber 59 increases accordingly. However, with this increase in oil pressure, the downward pressing force of the piston 60 due to oil pressure in the output hydraulic chamber 59 immediately increases and the piston 60 is again moved downwards to cut off the communication between both the hydraulic chambers 57 and 59. Thereafter, with an increase in oil pressure exerting on the input hydraulic chamber 57 from the inlet 56. the likewise operation is repeatedly carried out, as a consequence of which output oil pressure of the first braking hydraulic adjusting means 5 is reduced proportionally and transmitted to the second braking hydraulic adjusting means 24.

The other proportional reducing valve 22' has the same construction as that of the aforementioned proportional reducing valve 22 except that the input hydraulic chamber and output hydraulic chamber are brought into communication with the oil passages 23a', 23b', respectively. Reference numerals with dash (') are affixed to parts corresponding to the proportional reducing valve 22 though details will be omitted. Particularly immediatelY after the starting of braking operation, the oil pressure lowering action of the paired proportional reducing valves 22, 22' hold the oil pressure within the pair of primary braking hydraulic chambers 25, 25' lower than that within the pair of primary braking hydraulic chambers 6, 6' in accordance with distribution of the supporting load for both front and rear wheels. As a result, after the starting of braking operation, the oil pressure generated within the secondary braking hydraulic chambers 14, 14' on the front wheel side becomes larger than that generated within the secondary braking hydraulic chambers 33, 33' on the rear wheel side. Thus, there occurs such an accident that the secondary braking hydraulic system on the front wheel side is failed and no oil pressure is transmitted to the wheel cylinders 19, 19' on the front wheel side, the loss in a braking effect for the entire vehicle is increased comparing to the case where the secondary braking hydraulic system on the rear wheel side is failed, thereby resulting in a disadvantageous condition. Therefore, as a means for preventing the occurrence of such condition, the pair of oil passages 18, 18' are capable of being communicated with the corresponding oil passages 37, 37' through oil passages 86, 86', respectively which include check valves 85, 85' in the intermediate portions thereof. With this, in the event the secondary braking hydraulic system on the front wheel side is so failed that there occurs no secondary braking oil pressure in at least one of the paired secondary braking hydraulic chambers 14, 14' and the oil pressure within the wheel cylinder hydraulic chambers 39, 39' on the rear wheel side becomes higher than that within the wheel cylinder hydraulic chambers 20, 20' on the front wheel side above the setting pressure, the oil pressure within the secondary braking hydraulic chambers 33, 33' on the rear wheel side is immediately transmitted to the corresponding wheel cylinder hydraulic chambers 20, 20' on the front wheel side.

The antilock controlling system AL will be described hereinafter. Controlling oil pressurized by a plunger pump P is fed to the intake pressure control valve 41 through a check valve 45 and an oil passage 47 which is communicated at its intermediate portion with an accumulator 46, and also to the intake pressure control valve 43 through an oil passage 48 branched off from the oil passage 47. On the other hand, the controlling oil exhausted from the exhaust pressure control valve 42 is fed to an oil tank 51 through an oil passage 49, and the controlling oil exhausted from the exhaust pressure control valve 44 is fed to the oil tank 51 through both oil passages 50 and 49. Thus, the controlling oil within the oil tank 51 enters into the hydraulic source P through an oil passage 53 and a check valve 54 after passing through a filter 52 so as to be pressurized once again.

In such an antilock braking device, the first braking hydraulic adjusting means 5, the second braking hydraulic adjusting means 24, the pair of proportional reducing valves 22, 22', the intake pressure control valves 41, 43, the exhaust pressure control valves 42, 44 and the oil tank 51 are integrally formed in a casing 75 as an assembly as shown in FIGS. 2 and 3.

The first braking hydraulic adjusting means 5 and the second braking hydraulic adjusting means 24 are arranged up and down in different positions in the casing 75. That is, the second braking hydraulic adjusting means 24 is arranged up substantially horizontally, and the first braking hydraulic adjusting means 5 is arranged down substantially horizontally. Moreover, the proportional reducing valve 22 is arranged obliquely vertically with the flowing direction of braking oil made to be vertical, for example, with the output hydraulic chamber 59 positioned up in this embodiment to connect both the braking hydraulic adjusting means 5 and 24. The proportional reducing valve 22 is arranged so that the output hydraulic chamber 59 may assume a position substantially corresponding to the upper surface of the cylinder portion 26 of the second braking hydraulic adjusting means 24, and the oil passage 23b is disposed substantially horizontally. A bleeder passage 76, which is communicated with the interior of the oil passage 23b and cylinder portion 26, is formed in the casing 75, and a bleeder plug 78 with a cap 77 is threadedly mounted on the bleeder passage 76. Also, the oil passage 23a in communication with the input hydraulic chamber 57 of the proportional control valve 22 extends substantially horizontally and is formed in the casing 75 and is communicated with the cylinder portion 7 of the first braking hydraulic adjusting means 5.

The other proportional reducing valve 22' is also disposed with the flowing direction made to be vertical, for example, obliquely vertically, likewise said one proportional reducing valve 22, though not shown in FIGS. 2 and 3.

The proportional reducing valves 22 and 22' are disposed vertically as described above whereby removal of air is carried out easily and positively when braking oil is poured into the hydraulic system. That is, the caps 77, 77' of the bleeder plugs 78, 78' in positions corresponding to the uppermost positions of the proportional reducing valves 22, 22' are opened to loosen the bleeder plugs 78, 78' to remove air, whereby air can be positively expelled from the proportional reducing valves 22, 22'.

In addition, the first braking hydraulic adjusting means which effects brake-controlling on the front wheel side subject ro a larger load of vehicle weight when the brakes are applied is arranged below the second braking hydraulic adjusting means 24 and the proportional reducing valves 22, 22' are arranged vertically therebetween, and therefore, a spacing between the first and second braking hydraulic adjusting means 5, 24 can be reduced and the assembly as a whole can be made compact.

Furthermore, even if an inconvenience occurs in the hydraulic system in the second braking hydraulic adjusting means 24 and the secondary braking oil pressure is not exerted on the brakes, the first braking hydraulic adjusting means which effects brake-controlling on the front wheel side subject to a larger load of vehicle weight when the brakes are applied can be positively actuated, without being affected thereby, to effectively secure the braking of the automobile.

In general automobiles, the front wheel side increases in a weight load of the vehicle which the brakes are applied. However, in the case of a special automobile in which the rear wheel side is subjected to the majority of vehicle weight and distribution of weight load almost remains unchanged even when the brakes are applied, it is necessary that the second braking hydraulic adjusting means 24 which effects brake-controlling on the rear wheel side is disposed in a position lower than the first braking hydraulic adjusting means; conversely to the former case.

Figure 4:
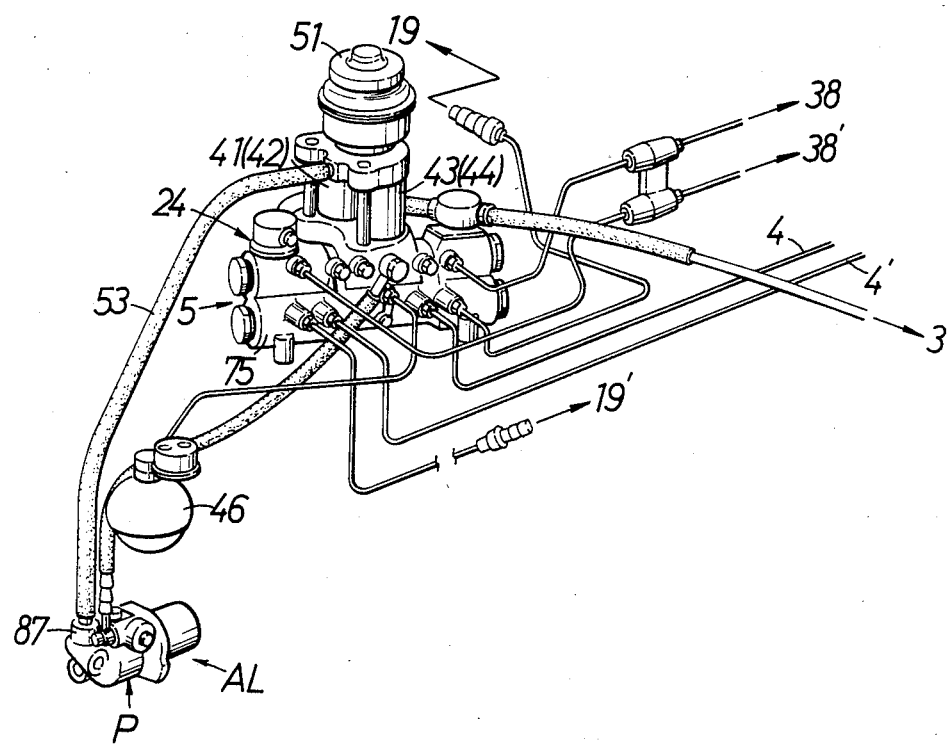
FIG. 4 is a perspective view showing an arrangement of a pump and a reservoir.

Referring to FIG. 4, a suction joint portion 87 in the pump P is disposed in a position lower than the reservoir 51. Thus, even if air is mixed into the oil passage 53, the air is moved upwards by its own buoyancy and reaches the reservoir 51 without staying in the oil passage 53 and is then released outside. As the result, it is possible to effectively prevent air within the oil passage 53 from being moved towards the pump P to lower pressure of controlling oil.

Figure 5:
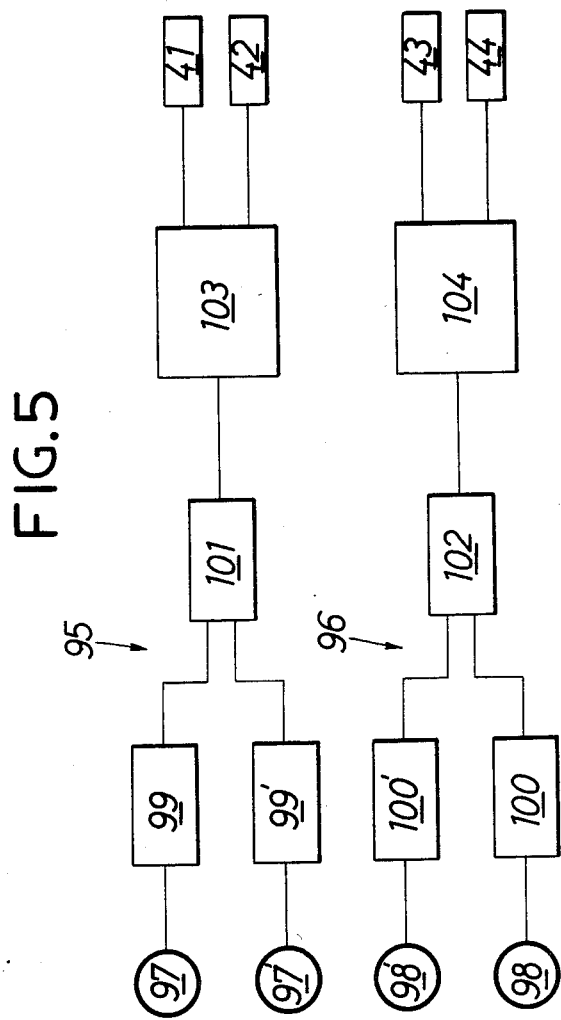
FIG. 5 is a block diagram showing the structure of an electronic control section.

Hereinafter there will be described an opening and closing control system for the intake pressure control valves 41, 43 and the exhaust pressure control valves 42, 44 in the antilock controlling system Referring now to FIG. 5, both intake pressure control valve 41 and exhaust pressure control valve 42 are controlled to be opened and closed by a later stage-actuated type antilock controlling hydraulic feeder 95, while both intake pressure control valve 43 and exhaust pressure control valve 44 are controlled to be opened and closed by an earlier stage-actuated type antilock controlling hydraulic feeder 96. A wheel speed detector 97 for right front wheel generates a signal which is converted into a wheel speed signal proportional to the circumferential speed of the right front wheel by a wheel speed calculator 99 and then sent to a high-speed signal selector 101 such as a high selecting circuit, while a wheel speed detector 97' for left front wheel generates a signal which is converted into a wheel speed signal proportional to the circumferential speed of the left front wheel by a wheel speed calculator 99' and then sent to the high-speed signal selector 101. The high-speed signal selector 101 selects one of the wheel speed signals corresponding to either one of the left and right front wheels which has the higher circumferential speed, and transmits the selected signal to a front wheel control circuit 103. The front wheel control circuit 103 calculates the slip factor and shift in speed on either one of the left and right front wheels which has the higher circumferential speed, and it normally holds the intake pressure control valve 41 in the closed state and the exhaust pressure control valve 42 in the opened state. But, when either one of the left and right front wheels which has the higher circumferential speed, i.e., the wheel coming into the locked state later, is brought into the locked state, the control circuit 103 makes the intake pressure control valve 41 change to the opened state and the exhaust pressure control valve 42 change to the closed state immediately, so that the controlling oil fed from the pump P may be introduced into the antilock controlling hydraulic chamber 13.

On the other hand, a wheel speed detector 98' for right rear wheel generates a signal which is converted into a wheel speed signal proportional to the circumferential speed of the right rear wheel by a wheel speed calculator 100', and then sent to a low-speed signal selector 102 such as a low selecting circuit, while a wheel speed detector 98 for left rear wheel generates a signal which is converted into a wheel speed signal proportional to the circumferential speed of the left rear wheel by a wheel speed calculator 100' and then sent to the low-speed signal selector 102. The low-speed signal selector 102 selects one of the wheel speed signals corresponding to either one of the left and right rear wheels which has the lower circumferential speed, and transmits the selected signal to a rear wheel control circuit 104. The rear wheel control circuit 102 calculates the slip factor and shift in speed on either one of the left and right wheels which has the lower circumferential speed, and it normally holds the intake pressure control valve 43 in the closed state and the exhaust pressure control valve 44 in the opened state. But, when either one of the left and right rear wheels which has the lower circumferential speed, i.e., the wheel coming into the locked state earlier, is brought into the locked state, the control circuit 104 makes the intake pressure control valve 43 change to opened state and the exhaust pressure control valve 44 change to the closed state immediately, so that the controlling oil fed from the pump P may be introduced into the antilock controlling hydraulic chamber 32.

The intake pressure control valves 41, 43 and the exhaust pressure control valves 42, 44 may be of electromagnetic control valves to be actuated by electromagnetic solenoids. In this case, the intake pressure control valves 41 and 43 can be constituted such that they are held in the closed state when not energized and in the opened state when energized, while the exhaust pressure control valves 42 and 44 can be constituted such that they are held in the opened state when not energized and in the closed state when energized.

Next, operation of the embodiment of the present invention will be described.

When the brake pedal 2 is trod on for braking operation, the braking pressure generated within the master cylinder 1 is transmitted into the primary braking hydraulic chambers 6, 6' on the front wheel side through the oil passages 4, 4' and also into the primary braking hydraulic chambers 25, 25' on the rear wheel side through the oil passages 23a, 23a', the proportional reducing valves 22, 22' and the oil pasages 23b, 23b'. As a result, each pair of pistons 11. 11' and 30, 30' are pushed by virtue of the primary braking oil pressure within the primary braking hydraulic chambers 6, 6' and 25, 25', respectively, so that the rods 10, 10' and 29, 29' are moved to approach each other in the corresponding cylinders 7, 26 in the axial direction thereby causing the secondary braking oil pressure within the respective secondary braking hydraulic chambers 14, 14' and 33, 33'. At this time, the pair of proportional reducing valves 22, 22' makes an adjustment in such a manner that the primary braking oil pressure within the primary braking hydraulic chambers 25, 25' on the rear wheel side becomes lower than that within the primary braking hydraulic chambers 6, 6' on the front wheel side in accordance with distribution of the supporting load for the both wheels. Accordingly, the secondary braking oil pressure generated within the secondary braking hydraulic chambers 33, 33' on the rear wheel side assumes a lower level than that generated within the secondary braking hydraulic chambers 14, 14' on the front wheel side in accordance with distribution of the supporting load for both wheels.

The secondary braking oil pressure generated within the secondary braking hydraulic chambers 14, 14' on the front wheel side is immediately transmitted to the wheel cylinder hydraulic chamber 20 of the wheel cylinder 19 for left front wheel and the wheel cylinder hydraulic chamber 20' of the wheel cylinder 19' for right front wheel through the oil passages 18, 18', respectively, thereby applying the braking force to the left and right front wheels. Meanwhile, the secondary braking oil pressure generated within the secondary braking hydraulic chambers 33, 33' on the rear wheel side is immediately transmitted to the wheel cylinder hydraulic chamber 39 of the wheel cylinder 38 for right rear wheel and the wheel cylinder hydraulic chamber 39' of the wheel cylinder 38' for left rear wheel through the oil passages 37, 37', respectively, thereby applying the braking force to the left and right rear wheels.

If the secondary braking hydraulic system on the front wheel side be failed with some reason and, at the time of braking, the oil pressure within the wheel cylinder hydraulic chamber 39 or 39' on the rear wheel side becomes higher than that within the wheel cylinder hydraulic chamber 20 or 20' on the front wheel side above the setting pressure for the corresponding check valve 85 or 85', the oil pressure within the corresponding secondary braking hydraulic chamber 33 or 33' on the rear wheel side is immediately transmitted into the wheel cylinder hydraulic chamber 20 or 20' on the front wheel side through the oil passage 86 or 86', thereby to compensate the loss in braking force on the front wheel side.

While braking, when either one of the left and right front wheels coming into the locked state later is brought into the locked state, the intake pressure control valve 41 is changed from the closed state to opened state and the exhaust pressure control valve 42 is changed from the opened state to the closed state by operation of the later stage-actuated type antilock controlling hydraulic feeder 95, whereby the controlling oil fed from the pump P is directly introduced into the antilock controlling hydraulic chamber 13 thereby to push the pair of pistons 11 and 11' in the direction departing from each other. As a result, the secondary braking oil pressure within the secondary braking hydraulic chambers 14, 14' is lowered so that the braking force exerted on the left and right front wheels from the wheel cylinders 19, 19' is moderated or released until the left and right rear wheels become free from the locked state. During the process, the oil within the releasing oil chambers 15, 15' is pushed by the pistons 12, 12' to be returned into the oil tank 3 through the oil passages 40, 40', the releasing oil chambers 34, 34' and the oil passage 21.

In the event at least one of the left and right rear wheels is locked, the earlier stage-actuated type antilock controlling hydraulic feeder 96 operates to open the pressure control valve 43 which has been closed while closing the exhaust pressure control valve 44. In consequence, the control oil delivered by the pump P is introduced into the antilock controlling hydraulic chamber 32 to push the pair of pistons 30 and 30' in the direction departing from each other. As a result, the secondary braking oil pressure within the secondary braking hydraulic chambers 33, 33' is lowered so that the braking force exerted on the left and right rear wheels from the wheel cylinders 38, 38' is moderated or released until the left and right rear wheels become free from the locked state. During this process, the oil within the releasing oil chambers 34, 34' is pushed by the pistons 31, 31' to be returned into the oil tank 3 through the oil passage 21.

What is claimed is:

1. In an antilock braking device for vehicles, including:
    a first braking oil pressure adjusting means operable to restrain braking oil pressures, working on wheel cylinders associated with respective left and right front wheels, in response to a front wheel antilock control oil pressure;
    a second braking oil pressure adjusting means operable to restrain braking oil pressures, working on wheel cylinders associated with respective left and right rear wheels, in response to a rear wheel antilock control oil pressure;
    an antilock control system having an oil tank and a pump adapted for pressurizing a control oil fed from said oil tank, said antilock control system being operable to generate said antilock control oil pressures;
    and a tandem type master cylinder having a pair of output ports formed independently of each other and adapted to output said braking oil pressures, respectively, said output ports being connected to both the first and second braking oil pressure adjusting means;
    wherein a proportional reducing valve is disposed in an oil passage connecting between said first and second braking oil pressure adjusting means for transmitting the braking oil pressure from one of the first and second braking oil pressure adjusting means, of which associated wheels are subjected to larger supporting load than the wheels associated with the other braking oil pressure adjusting means, at a reduced rate to the other braking oil pressure adjusting means;
    the improvement wherein said first and second braking oil pressure adjusting means and said proportional reducing valve are formed integrally with each other in a casing with said proportional reducing valve disposed at an inclination to a horizontal plane in said casing;
    said one braking oil pressure adjusting means of which associated wheels are subjected to the larger supporting load being located in said casing in a position lower than the other braking oil pressure adjusting means and being connected to an input portion of said proportional reducing valve while said other braking oil pressure adjusting means is connected to an output portion of said proportional reducing valve in said casing higher than said input portion.

2. In an antilock braking device as set forth in claim 1, wherein said output portion of the proportional reducing valve in said casing has an upper surface, said other braking oil pressure adjusting means in said casing is connected to said upper surface via a substantially horizontally extending oil passage, whereas said input portion of the proportional reducing valve in said casing is connected to the one braking oil pressure adjusting means via another substantially horizontally extending oil passage in said casing.

3. In an antilock braking device as set forth in claim 2, wherein a bleeder passage is provided in said casing and communicates in said casing with said other braking oil pressure adjusting means and with said oil passage connecting between said adjusting means and the output portion of the proportional reducing valve, said bleeder passage having an outside end opening in said casing to which a bleeder plug is fitted.

4. In an antilock braking device as set forth in claim 1, wherein said one and other braking oil pressure adjusting means in said casing are disposed substantially horizontally on different vertical planes.

5. In an antilock braking device as set forth in claim 1, wherein said oil tank of the antilock control system is disposed upwardly of said casing while said pump of the antilock control system has a suction joint portion connected to said oil tank, said suction joint portion being disposed in a position lower than said oil tank.

6. In an antilock braking device as set forth in claim 5, wherein said antilock control system further includes an accumulator and an antilock oil pressure control valve means which is operable to feed an oil pressure, supplied from said pump via said accumulator, to said first and second braking oil pressure adjusting means in said casing as said antilock control oil pressures, said antilock oil pressure control valve means being disposed on an upper side portion of said casing in an integral manner with said casing, said oil tank being arranged in a position higher than said antilock oil pressure control valve means, whereas said accumulator is disposed below said casing and said pump is disposed below said accumulator.

7. In an antilock braking device as set forth in claim 6, wherein said antilock oil pressure control valve means in said casing comprises an intake pressure control valve for feeding said antilock control oil pressures to said braking oil pressure adjusting means and an exhaust pressure control valve for releasing said antilock control oil pressures to the oil tank.

8. In an antilock braking device as set forth in claim 1, wherein said oil tank is formed integrally with said casing.

9. In an antilock braking device as set forth in claim 6 wherein said oil tank is formed integrally with said casing.

* * * * *

UNITED STATES PATENT AND TRADEMARK OFFICE
CERTIFICATE OF CORRECTION

PATENT NO. : 4,579,393
DATED : April 1, 1986
INVENTOR(S) : Makoto SATO et al

It is certified that error appears in the above-identified patent and that said Letters Patent is hereby corrected as shown below:

On the cover page, Item [73], "Nissan Kogyo Kabushiki Kaisha" should read --Nissin Kogyo Kabushiki Kaisha--.

Signed and Sealed this

Twenty-fifth Day of November, 1986

Attest:

DONALD J. QUIGG

Attesting Officer        Commissioner of Patents and Trademarks